(No Model.) 10 Sheets—Sheet 2.

J. COWMAN, W. E. DICKINSON & T. J. LUMIS.
CIGARETTE MACHINE.

No. 262,177. Patented Aug. 1, 1882.

(No Model.) 10 Sheets—Sheet 3.
J. COWMAN, W. E. DICKINSON & T. J. LUMIS.
CIGARETTE MACHINE.

No. 262,177. Patented Aug. 1, 1882.

Fig. 3.

Witnesses:
Walter Fowler,
Chas. E. Gill

Inventors:
John Cowman,
Wm. E. Dickinson &
Thomas J. Lumis;
By their Attorney,
Rowland Cox (No Model.) 10 Sheets—Sheet 4.
J. COWMAN, W. E. DICKINSON & T. J. LUMIS.
CIGARETTE MACHINE.

No. 262,177. Patented Aug. 1, 1882.

Fig. 4.

Witnesses;
Walter Fowler
Chas. P. Gill

Inventors;
John Cowman,
Wm. E. Dickinson &
Thomas J. Lumis;
By their Attorney
Rowland Cox.

(No Model.) 10 Sheets—Sheet 6.
J. COWMAN, W. E. DICKINSON & T. J. LUMIS.
CIGARETTE MACHINE.

No. 262,177. Patented Aug. 1, 1882.

Witnesses:
Walter Fowler
Chas. A. Gill

Inventors:
John Cowman,
Wm. E. Dickinson,
and
Thomas J. Lumis.
By their Attorney.
Rowland Cox (No Model.) 10 Sheets—Sheet 9.
J. COWMAN, W. E. DICKINSON & T. J. LUMIS.
CIGARETTE MACHINE.
No. 262,177. Patented Aug. 1, 1882.

Witnesses;
Walter Fowler
Chas. P. Gill

Inventors;
John Cowman,
Wm. E. Dickinson &
Thomas J. Lumis,
By their Attorney,
Rowland Cox

UNITED STATES PATENT OFFICE.

JOHN COWMAN, OF NEW YORK, N. Y., AND WILLIAM E. DICKINSON AND THOMAS J. LUMIS, OF HARTFORD, CONNECTICUT, ASSIGNORS TO THE COWMAN MANUFACTURING COMPANY, OF NEW YORK, N. Y.

CIGARETTE-MACHINE.

SPECIFICATION forming part of Letters Patent No. 262,177, dated August 1, 1882.

Application filed March 23, 1882. (No model.)

*To all whom it may concern:*

Be it known that we, JOHN COWMAN, of New York, N. Y., and WM. E. DICKINSON and THOMAS J. LUMIS, of Hartford, in the county of Hartford and State of Connecticut, have invented a new and useful Improvement in Cigarette-Machines, of which the following is a specification, reference being had to the accompanying drawings.

The invention relates to an improvement in cigarette-machines; and it consists in the elements hereinafter described, and pointed out in the claims.

Referring to the accompanying drawings, Fig. 11 is a detached vertical section, showing the tilting table $Y^3$ in an upright position, the arms $R^4$ thrown forward in position to take the strip of paper from said tilting table, and the flexible sheet $n$, the dotted lines showing the different positions of the devices. Fig. 12 is a detached view of the rear end of the arm $X^4$. Fig. 13 is a detached side view of the rear portion of the arm $R^4$ and arm $X^4$. Fig. 14 is a view of the left-hand end of the carriage $J^4$, showing one of the arms $R^4$ in a vertical position, and the mechanism whereby it is thrown forward. Fig. 15 is a top view, partly in section, of one of the arms $R^4$ and connections. Fig. 16 is a detached vertical section of the paste-rollers.

Figure 1:
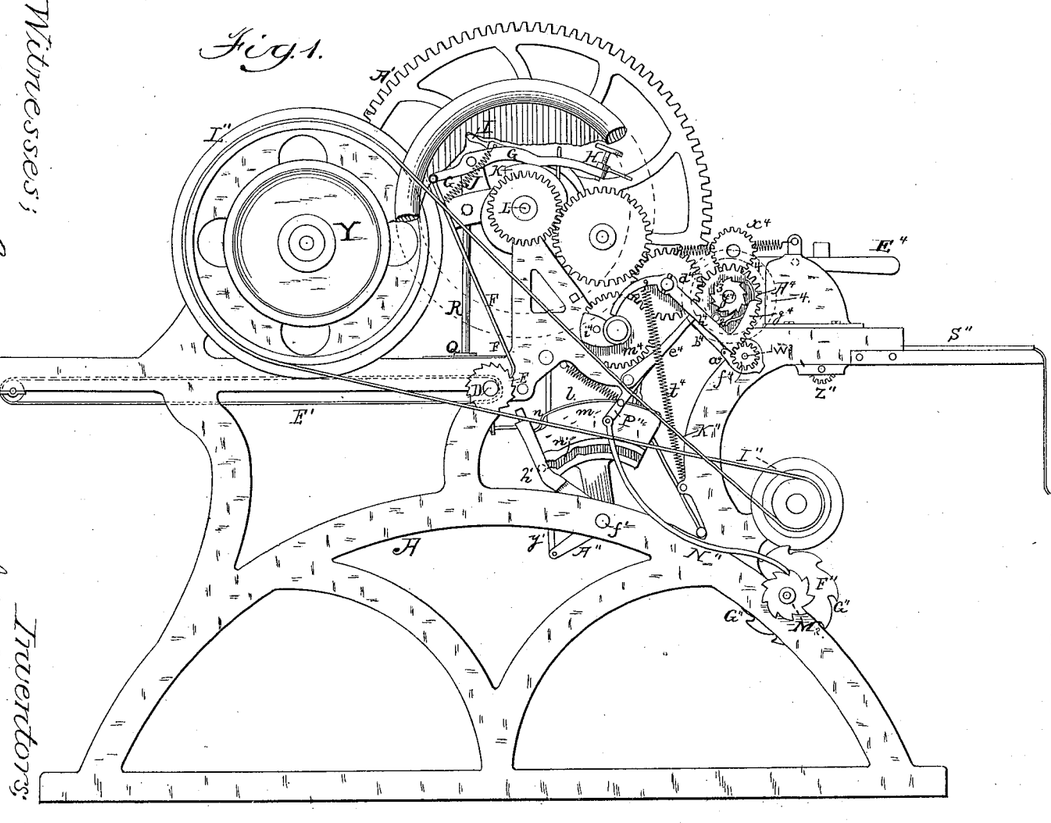
Figure 1 is an elevation of the right-hand side of the machine.

A B denote the two sides of the machine, in the rear portion of which, upon the rollers C D, is arranged the horizontal traveling feed belt or apron $E'$, upon which the tobacco is placed by hand when the machine is in operation, and by which it is carried forward to the knife, hereinafter described. The front roller, D, is provided at its right-hand end (see Fig. 1) with the ratchet-wheel E, which is operated by the long pawl F, pivoted in the rear end of the lever G, mounted upon a pivot or lug on the side A of the machine. The front portion of the lever G has a set-screw and locking-nut, H, by which the extent of its sweep may be regulated. The pawl F is connected with the hand-lever I (which is pivoted on the side of the lever G) by a spring, J, by means of which connection the pawl may be thrown clear of the ratchet-wheel E, and its effect upon the same thus discontinued when desired. The central and forward parts of the lever G rest upon a cam, K, secured upon the right-hand end of the shaft L, and are alternately raised and lowered by the same as the shaft is operated. When the lever G is raised it depresses the pawl and causes the ratchet-wheel E to rotate a given distance; and this movement of the wheel is communicated to the front roller, D, which, upon revolving, causes the belt or apron $E'$ to move forward and feed the tobacco a distance equal in length to the rotation of the ratchet-wheel E. It will be perceived that the feeding of the tobacco is thus intermittent, it being fed forward only when the greatest eccentricity of the cam K is in contact with the under surface of the lever G. In order to discontinue this feeding forward of the tobacco, it is only necessary to throw the pawl F from the wheel E by the lever I and spring J, when the other parts of the machine may be operated at will without affecting the apron E' or the tobacco.

Figure 3:
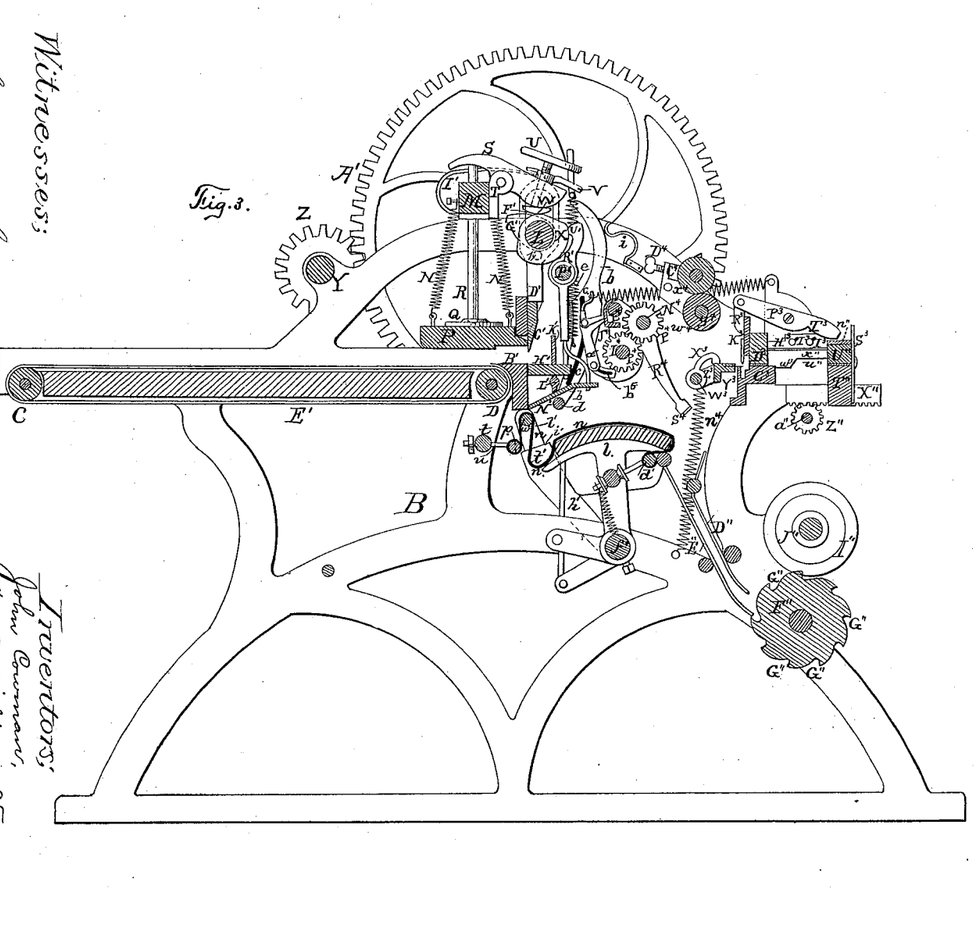
Fig. 3 is a central vertical longitudinal section of same.

Over the front portion of the apron E', and elevated a suitable distance above the same, the sides A B are connected by a bar, M, from which is suspended, by the springs N, (four springs by preference being employed,) the presser-board P, (see Fig. 3,) which has a limited vertical movement, as hereinafter described, and is employed to press the sheet of tobacco and hold it down while the tobacco-knife is making its cut.

In the center of the presser-board P, upon its upper surface, is a seat, Q, in which rests the lower end of the post or vertical rod R, the upper portion of which passes through an aperture in the bar M, and the upper extremity of which is impinged by the dog S, mounted on an axle between the ears T, the forward end of the dog being provided with a set-screw, U, and locking-nut V, by which the extent of its movement is regulated. The lower end of the screw U is provided with a little bearing, W, which rests upon the cam X, secured at about the center of the shaft L. When the shaft L is rotated the cam X will at regular intervals elevate the front end of the dog S, thereby depressing its rear end, which, acting upon the post R, depresses it and causes the presser-board P to lower upon the tobacco, flattening it out and making a firm layer. After the bulge of the cam X has passed the end of the dog S the springs N will draw the presser-board P up from the tobacco, and thereby elevate the post R to its former position. The shaft L, carrying the cam X, receives its motion from the driving-shaft Y and the connecting gear-wheels Z and A'.

Figure 25:
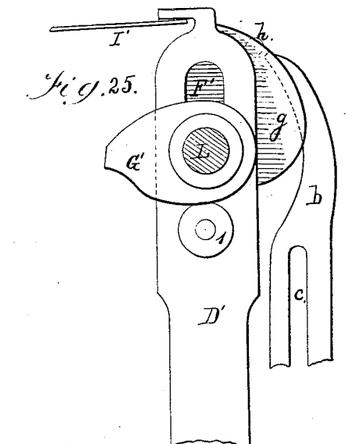
Fig. 25 is a detached view, showing the upper end of one of the bars $D'$, supporting the tobacco-knife, and one of the bars or plates $b$, carrying the pocket-roller.

In front of the forward end of the belt E' is a bar, B', extending across the machine and forming a continuation of the tobacco feed-table. The tobacco is cut off in strips of appropriate size and at the proper time by the knife C', which extends across the machine and is rigidly secured to the lower ends of the vertical bars D', (see Figs. 3 and 25,) which pass upward and are provided in their upper portions with the elongated slots F', which encircle the ends of the shaft L. Below the slots F' are secured, upon the sides of the bars D', the wheels 1, which are acted upon by the cams G', mounted on the shaft L. The rotation of the shaft L causes the cams G' at regular intervals to press against the wheels 1 at the lower ends of the slots F', and thereby depress the said bars D', whereby the knife C' is made to pass downward between the slide H', hereinafter described, and the bar B', and to sever that portion of the tobacco which had before been fed in front of its cutting-edge. After the knife C' has reached its lowest point—that is, when the pressure of the cams G' upon the wheels 1 has ceased—the springs I' will draw the knife and vertical bars back to their former position, where they will remain until the cams G' again depress them. Between the time at which the knife C' is elevated and the time at which it is again depressed the table or belt E' feeds forward a sufficient quantity of tobacco to be used in forming another roll or elongated cigarette.

Figure 4:
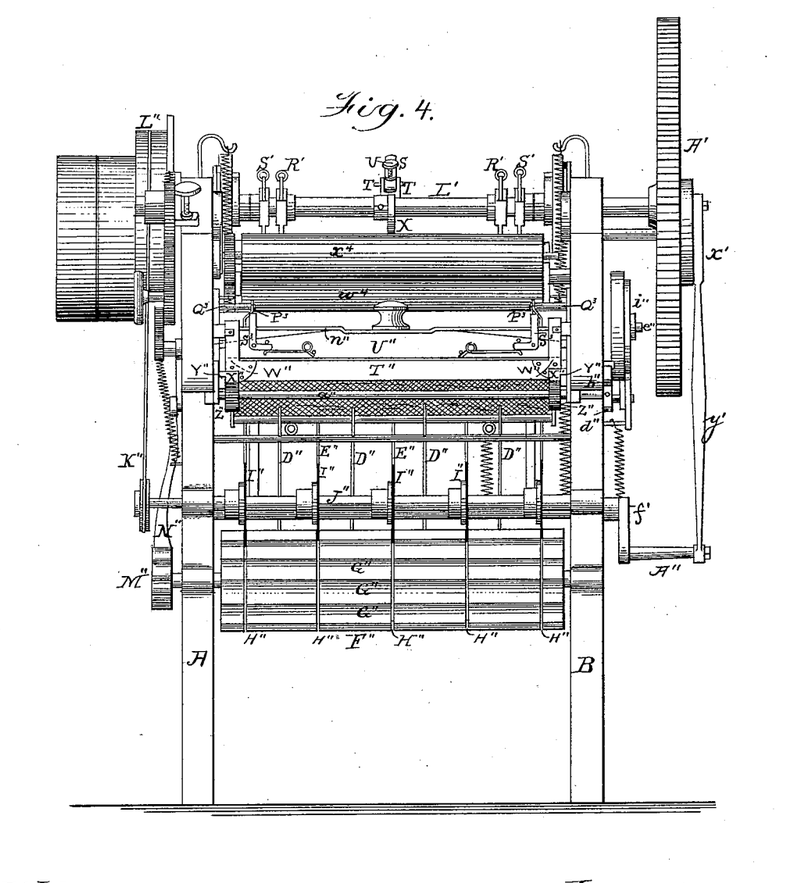
Fig. 4 is a front view of the machine.
Figure 5:
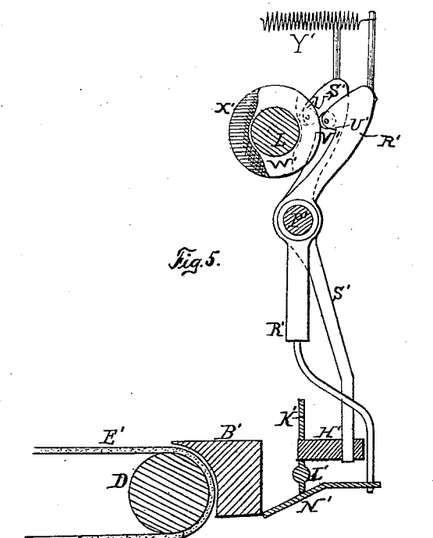
Fig. 5 is a detached sectional view of the front end of the tobacco feed-table, upper and lower slides, and connecting mechanism.
Figure 18:
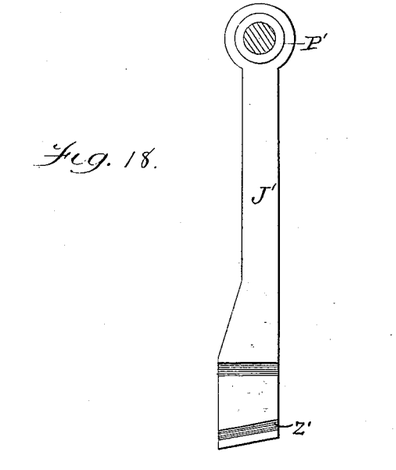
Fig. 18 is a detached side view of the standard $J'$.
Figure 19:
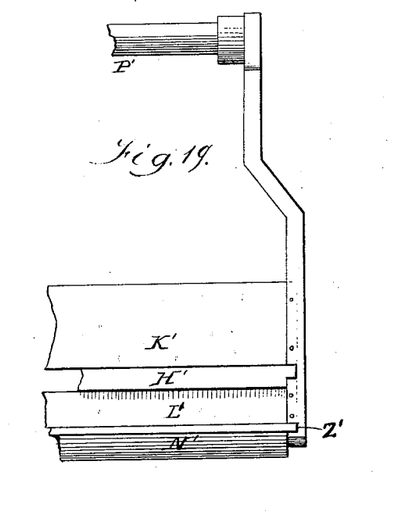
Fig. 19 is a broken detached view of the standard $J'$, upper and lower slides, and upper and lower scraping-bars.
Figure 20:
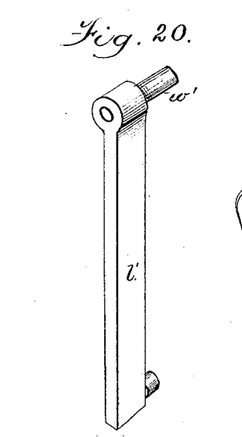
Fig. 20 is a detached perspective view of the arm $l'$.

In front of the table E' and tobacco-knife C', at each side of the machine, are rigidly secured the vertical bars J', (shown in Figs. 18 and 19,) between the lower ends of which are fastened the two bars or rods K' L', (shown in Figs. 3, 5, 18, and 19,) which are employed for the purpose of scraping the rod of tobacco after it has been cut by the knife C' from off the upper slide, H', and lower slide, N', as the said slides are moved toward the front. The slides H' N' hold the rod of tobacco after it has been cut until it is dropped into a pocket formed in the rolling-apron, hereinafter described. Between the upper ends of the bars J' is mounted a horizontal shaft, P', extending across the machine, and having arranged at its ends, between suitable collars, the swinging bars R' and S', the two bars R' being between the two bars S'. (See Figs. 3, 4, and 5.) The upper portions of the bars R' and S' are provided with the projecting surfaces U', carrying small bearing-wheels V', which impinge the surface of the cams W' and X', secured upon the shaft L, the wheels V' on the bars R' being in contact with the cams W', and those on the bars S' being in contact with the cams X'. The upper extremities of the bars R' and S' have a tension toward the rear of the machine by the springs Y', (see Fig. 5,) whereby the bearing-wheels V' are kept in firm contact with the cams W' and X'. The upper slide, H', is placed between the two scrapers or bars K' L', its upper surface being flush with the upper surface of the feed-table E', and is connected with the lower extremities of the bars S', whereby it is actuated when the machine is in operation. The lower slide, N', is set in the inclined grooves Z', formed in the lower ends of the bars J', and contains apertures in which the lower ends of the bars R' are placed. The lower edge of the lower slide, N', inclines downward against the lower portion of the table E'.

During the operation of the machine the tobacco knife C' passes downward between the table E' and upper slide, H', cutting off a rod of tobacco, which will rest upon the said slide until the same is actuated. At this point in the operation the rear edge of the lower slide, N', is in contact with the table E'. As soon as the knife C' has severed the strip of tobacco the upper slide, H', is caused to move toward the front by the tension of the springs Y', the projecting surfaces on the bars S' having passed the bulge on the cams X'. When the slide H' is thus moved toward the front the strip of tobacco resting upon it will be scraped off by the bar K' and fall upon the lower slide, N'. The motion of the machine continuing, the knife C' will be elevated by the cams G', and the upper slide, H', will at once resume its former position by reason of the cams X' acting upon the bars S', thus leaving the rod of tobacco inclosed between the two slides H' N'. During the movement the feed-table E' feeds forward a sufficient quantity of tobacco upon the upper slide to form another long cigarette. When the knife C' starts to descend again to sever another strip of tobacco the projecting surfaces on the bars R' will be passed by the bulge on the cams W', at which time the springs Y' will throw the lower ends of the said bars R' and the lower slide, N', toward the front, whereby the first rod of tobacco cut off is left unsupported and will fall into a pocket provided for it in the rolling-apron, hereinafter described. During the outward movement of the lower slide, N', the bar L' acts as a scraper to prevent the tobacco sticking to the slide. Before the second strip of tobacco is severed by the second descent of the knife C' the lower slide, N', will return to its position in contact with the table E', in order to catch the said strip of tobacco when the knife has completed its descent and the upper slide, H', has been moved toward the front. These movements of the two slides H' N' are continued with each revolution of the main shaft L, and the rod of tobacco is by them dropped into the said pocket, provided for it, in good condition.

Figure 6:
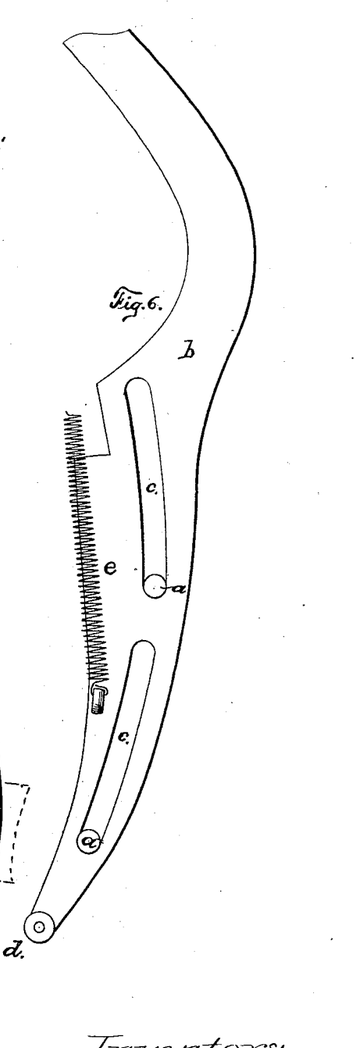
Fig. 6 is a detached side view of the plate $b$, carrying the roller for forming the cigarette-pocket in the rolling-apron.
Figure 7:
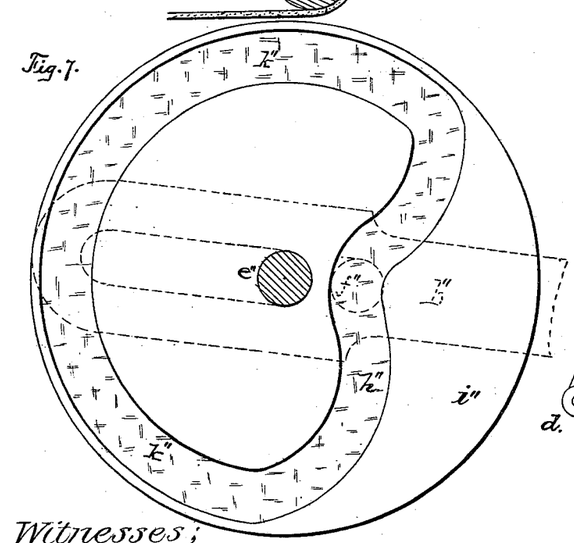
Fig. 7 is a face view of the wheel and cam driving the shaft or arm $b''$, the arm being shown in dotted lines.

Upon opposite sides of the machine, in front of the bars R' S', are secured, upon set-screws $a$, the sliding plates $b$, (see Figs. 3, 6, and 25,) one plate being at each side of the machine. In the plates $b$ are cut two curved slots, $c$, in which the set-screws $a$ are placed, the screws permitting the plates to slide without losing their position. Between the lower ends of the plates $b$ is mounted the pocket-roller $d$, and upon the inner face of the plates are small studs, to which the lower ends of the springs $e$ are secured, whereby the plates have a tension upward. Upon the ends of the shaft L are eccentrically secured the cam-shaped disks $g$, two corresponding disks, separated a distance about equal to the thickness of the plates $b$, being at each end of the shaft. At about the greatest eccentricity of the disks $g$ is secured, between each pair of them, a small wheel, $h$. When the disks are in motion they will pass over the sides of the plates $b$ until the small wheels $h$ come in contact with their upper ends, when the said plates will be forced downward with the pocket-roller $d$ until the wheels $h$ have passed said ends, at which time the springs $e$ will at once retract the plates to their former position. In order that the plates $b$ upon their upward movement may not jar the machine, springs $i$, against which they may strike as a cushion or buffer, have been provided.

Figure 2:
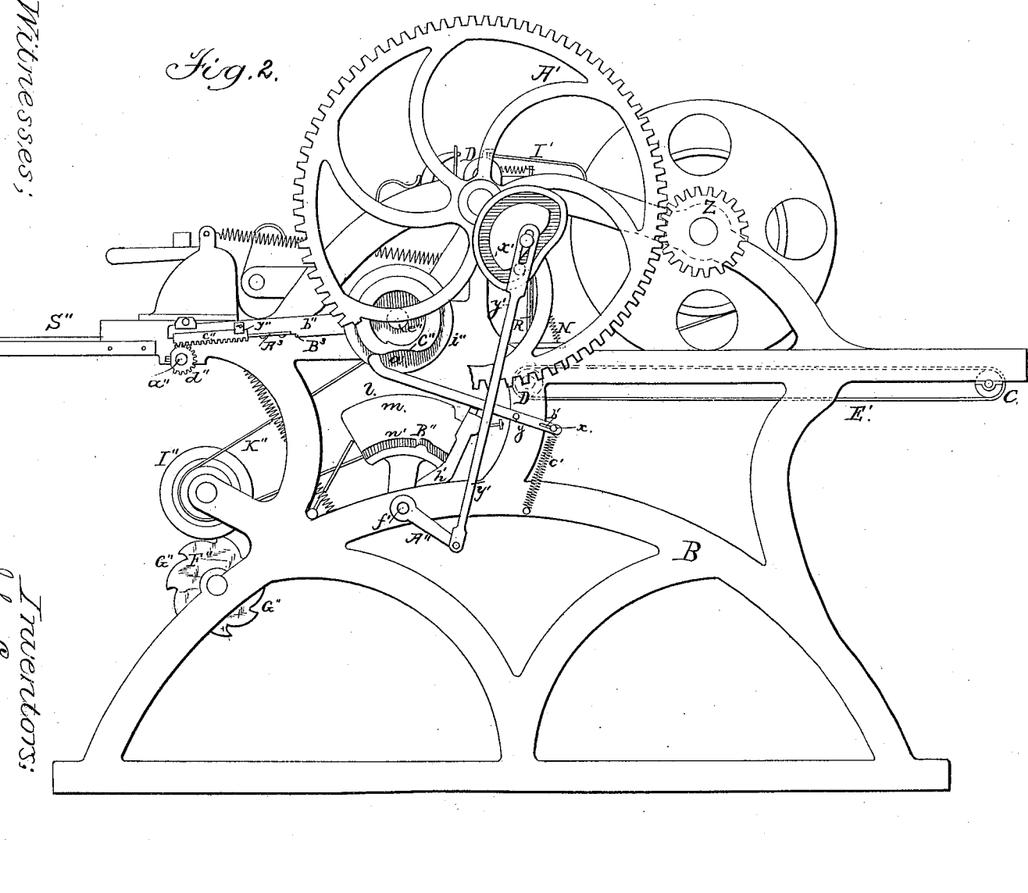
Fig. 2 is a similar view of the left-hand side of the machine.
Figure 21:
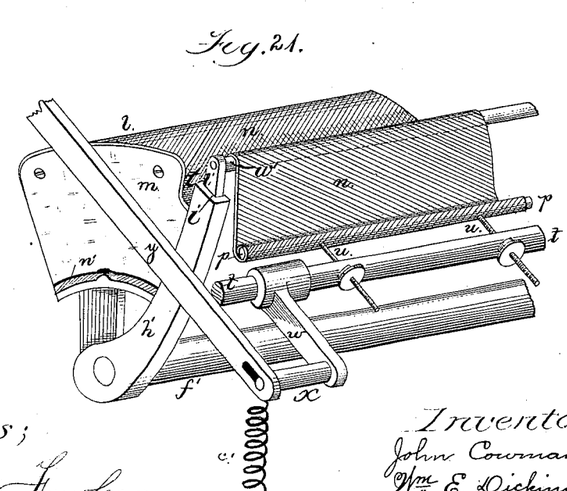
Fig. 21 is a detached perspective view of the table $l$ and attachments.
Figure 22:
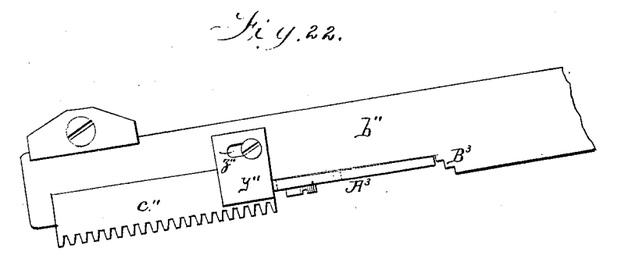
Fig. 22 is a detached side view of the front end of the arm $b''$.
Figure 23:
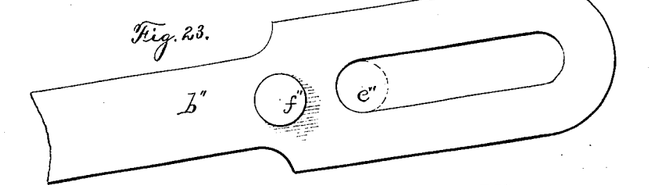
Fig. 23 is a similar view of the rear end of the said arm.
Figure 24:
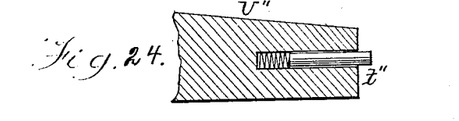
Fig. 24 is a detached section of one end of the upper jaw, $U''$.

Below and to the front of the knife C' is secured the convex table $l$, having segmental ends $m$, and upon which is placed the rolling-apron $n$. The rear end of the apron is secured upon a rod, $p$, (see Fig. 21,) which is connected with the rod $t$ by the set-screws $u$. The rod $t$ has bearings between the sides of the machine, and has the short arm $w$ on one of its ends, which arm is connected by a link, $x$, with the pivoted arm $y$, (see Fig. 2,) secured upon the left-hand side of the machine, and having its forward end in contact with the surface of the cam $a'$, its rear end containing a slot, $b'$, in which the end of the link $x$ may have a lateral movement, and being given a tension downward by the spring $c'$, whereby its front end is kept against the said cam $a'$. The front end of the apron $n$ is secured upon the rod $d'$, which is adjustable by set screws. (See Fig. 3.)

Upon the ends of the shaft $f'$, sustaining the table $l$, and between the segmental ends $m$ and the sides of the machine, are mounted the rocking bars $h'$, having a vertical groove, $i'$, upon their inner faces, in which grooves are placed the bars $l'$, adapted to have a vertical movement, and carrying upon their inner faces the wheels $m'$, which travel in the cam-slots $n'$, formed in the outer faces of the segmental ends $m$, and also carrying between their upper ends the roller $w'$.

When the machine is in operation the pocket-roller $d$ is driven downward between the rear edge of the table $l$ and the roller $w'$, whereby all slack in the apron $n$ is drawn to that point, and a cradle or pocket, $t'$, thus formed. (See Figs. 2, 11, and 21.) Upon the return of the plates $b$ and pocket-roller $d$ to their former position, which is accomplished in the manner hereinbefore described, the lower slide, N', moves to the front, and the rod of tobacco previously cut is thereby caused to fall into the pocket $t'$ preparatory to being rolled into a firm rod and to receiving the paper to complete the cigarette. At this point in the operation the carrier-bars $l'$ are at their highest position, and as the machine continues its motion the rocking bars $h'$ rotate toward the front, the bars receiving their motion from the gear-wheel A', communicated through the cam $x'$, connecting-rod $y'$, and link A'', which latter is secured directly upon the end of the shaft $f'$. (See Fig. 2.) When the bars $h'$ are moved forward the wheels $m'$ travel down the incline (see Fig. 11) at the rear end of the cam-slots $n'$, thereby lowering the carriers $l'$ and also the rod $w'$, whereby the pocket $t'$ is made to close on the strip of tobacco, after which the wheels $m'$ travel along the cam-slots $n'$ without interruption until the projections or elevations B'' in the slots are reached, when the wheels $m'$ will ride up the same, and thus elevate the carriers $l'$ and rod $w'$ a sufficient distance to permit the strip of paper, hereinafter described, (which at this point rests upon the front portion of the apron $n$,) to enter the pocket $t'$ and be rolled around the rod of tobacco by the forward movement of the upper fold of the apron.

While the rod $w'$ and carriers $l'$ are being lowered to close the pocket $t'$ at the commencement of their forward movement, as aforesaid, the depression $C''$ of the cam $a'$ on the outer face of the wheel $i''$ reaches the front end of the arm $y$, whereby said end is allowed to elevate slightly, and its rear end thus caused to lower, which has the effect of depressing the link $x$ and arm $w$ (see Figs. 2 and 21) and giving the rod $t$ a rocking movement, whereby the rod $p$ is thrown upward, and the tension on the apron $n$, caused by the downward movement of the rod $w'$ and carriers $l'$, thus relieved. The object of this is to permit the pocket $t'$ to remain of its full size until the rod of tobacco is started forward. After the rod $w'$ and carriers $l'$ have started to roll the strip of tobacco forward the depression $C''$ on the cam $a'$ will pass the end of the arm $y$, when the said end will be depressed, the rear end of same elevated, and the rods $t$ and $p$ rocked downward to their former position, and the slack in the apron $n$ thus taken up, and the pocket $t'$ reduced to an appropriate size to effectually roll the tobacco. The rod $w'$ and carriers $l'$ are moved forward until the strip of tobacco is rolled into the paper, and then passed over the front of the table $l$ and to the cutting devices, hereinafter described, whereby the long cigarette is severed into smaller cigarettes of the proper size for use.

The means for feeding the paper, cutting it off, and conveying it to the front portion of the table $l$, preparatory to being rolled around the rod of tobacco, will now be described.

Figure 8:
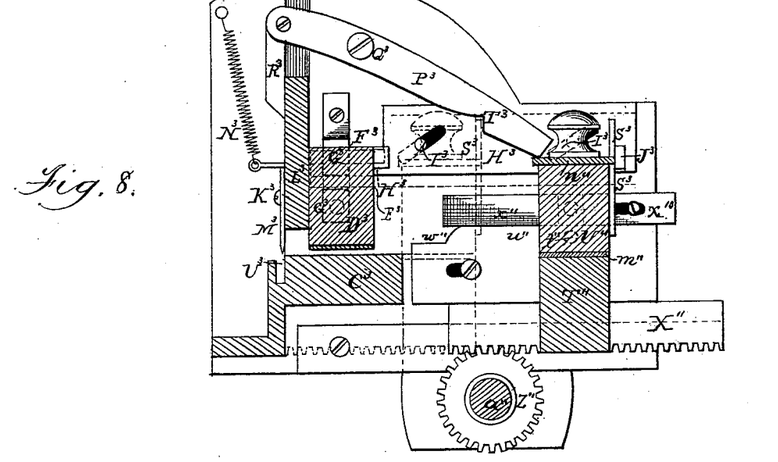
Fig. 8 is a central vertical section of the devices for feeding and cutting off the paper.

The paper is fed to the machine from a large roll, and its end passes over the table $S''$, between the jaws or nippers $T''$ $U''$, which are retained at their ends by the standards $W''$. (See Fig. 4.) The lower jaw, $T''$, is rigidly secured to the standards $W''$, and the upper jaw, $U''$, has a vertical movement in the standards as guides. The standards $W''$ are rigidly secured to the racks $X''$, one rack being at each side of the machine, which racks have a horizontal movement, carrying the jaws $T''$ $U''$. The teeth on the lower surface of the racks $X''$ mesh with the teeth on the gear-wheels $Z''$, mounted on the shaft $a''$, which has bearings in the sides of the frame of the machine, and receives its motion from the bar $b''$ (see Figs. 2, 4, 7, 22, and 23) on the left-hand side of the machine. The bar $b''$ carries a rack, $c''$, which meshes with the cog-wheel $d''$, secured on the end of the shaft $a''$. The rear end of the bar $b''$ is slotted and encircles the end of the shaft $e''$, whereby the bar is sustained in position and at the same time permitted to have a longitudinal movement. Upon the rear end of the bar $b''$ is secured a pin, $f''$, which enters the cam-slot $h''$ on the inner face of the wheel $i''$, by which the bar is actuated. When the wheel $i''$ is revolved the portion $k''$ of the cam will come in contact with the pin $f''$ and force it and the bar $b''$ forward, thereby causing the wheel $d''$ and shaft $a''$ to revolve, which movement causes the jaws $T''$ $U''$ to travel to the extreme of their forward movement, as shown in Fig. 8, the motion being imparted to the jaws by the wheels $Z''$ and racks $X''$. After the part $k''$ of the cam-slot $h''$ has passed the pin $f''$ the bar $b''$ has a movement toward the rear, and the jaws $T''$ $U''$ are thereby retracted to the extremity of their position on the rear stroke, as shown in dotted lines in Fig. 8. The lower jaw, $T''$, has a thin strip of packing, $m''$, on its upper surface, so as to more effectually bind the paper. The upper jaw, $U''$, has a downward tension imparted to it by the bar-spring $n''$, which tension, when the jaws are to be separated to permit the passage of the paper between them, is overcome by the pins $t''$, set in sockets in the ends of the upper jaw, $U''$, and having a spring-tension toward the sides of the machine. The points of the pins $t''$, when the jaws $T''$ $U''$ are in their forward position, press against the faces of the blocks $u''$, and when the jaws are in this position they are closed against each other. When the jaws $T''$ $U''$ are moved toward the rear the pins $t''$ scrape along the blocks $u''$ until they meet the recesses $w''$, when they enter the same, the jaws still remaining closed, and this being their rear position. Upon the return of the jaws $T''$ $U''$ the pins $t''$ ride up the front inclined wall of the recesses $w''$, and in doing so overcome the spring $n''$ and elevate the upper jaw from the lower, thereby permitting the escape of the paper, as hereinafter described. During the return of the jaws $T''$ $U''$ to the front the pins $t''$ travel in the inclined grooves $x''$ until the bases of the grooves become flush with the blocks $u''$, when the bar-spring $n''$ will force the upper jaw, $U''$, down upon the jaw $T''$, securely holding the paper between them. The base of the groove $x''$, against which the pins $t''$ slide, will by preference consist of a wedge-shaped block, which is shown in Fig. 8, and which bears the letter indicating the groove. When this block is employed it will preferably be secured by a pin and slot, $x^{10}$, so that the block may be adjusted longitudinally to force the pins $t''$ into the jaw $U''$ sufficiently to permit the spring $n''$ to force the said jaw downward upon the paper at the time it has traveled to the front a proper distance to insure the desired width of paper being fed into the machine. When it is desired to feed paper of narrow width the blocks $x''$ will be adjusted toward the rear, and if wider strips are necessary they will be adjusted toward the front. The movement of the jaws $T''$ $U''$ toward the rear feeds the paper into the machine, the width of the paper fed being regulated by the space traversed by the jaws. During their movement to the front the jaws assume a proper position to feed forward another supply of the paper. The distance the jaws shall move and the width of paper fed into the machine may be regulated at will by allowing more or less lost motion in the rack $c''$, which is retained upon the lower front end of the bar $b''$ by a set-screw and the plate $y''$, having the elongated slot $z''$, in which the set-screw is placed.

In rear of the rack $c''$ is secured, upon the lower end of the bar $b''$, by a set-screw, the plate $A^3$, which may be adjusted toward or from the rack $c''$. When the plate $A^3$ is adjusted close up to the rack $c''$ there will be no lost motion, and but one width of paper will be fed. When the plate $A^3$ is adjusted one-sixteenth of an inch, for example, toward the rear, the rack will have just so much lost motion before it acts upon the gear-wheel $d''$, and the width of paper fed will be one-sixteenth of an inch less than it was before. The width of paper fed is thus regulated by adjusting the plate $A^3$. (Shown more clearly in Fig. 22.) In practice several graduated steps, $B^3$, are cut in the bar $b''$, against which the plate $A^3$ may be set, the steps at the same time serving as a bearing and as a guide for adjusting the plate.

Figure 9:
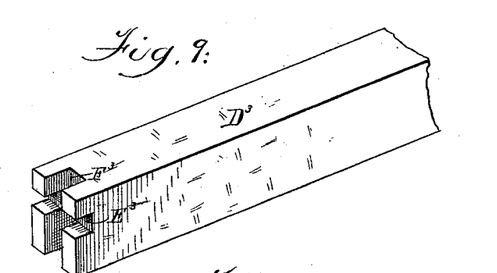
Fig. 9 is a detached view of one end of the bar $D^3$.
Figure 10:
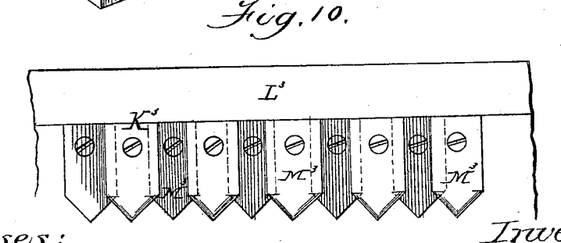
Fig. 10 is a detached view of the paper-cutting knife.

In rear of the lower jaw, $T''$, is secured across the machine the bar $C^3$, the upper surface of which is on a level with the upper surface of the lower jaw, and directly over the bar $C^3$ is arranged the bar $D^3$, the ends of which have transverse slots $E^3$ and vertical slots $F^3$, as shown in Figs. 8 and 9, the latter slots fitting over the two lugs $G^3$ at each side of the machine, and the transverse slots fitting over the rear ends of the sliding bars $H^3$, said ends also passing between the lugs $G^3$ at each end of the bar $D^3$. The sliding bars $H^3$ are secured by set-screws passing through the inclined slots $I^3$, cut in each of the bars, and are provided on their front portions with the studs $J^3$. When the upper jaw, $U''$, is moved toward the front, it strikes the studs $J^3$ and gives the sliding bars $H^3$ a movement forward and upward equal to the length of the slots $I^3$, and this movement of said bars $H^3$ elevates the bar $D^3$ slightly, so as to allow the paper to escape, as shown in Fig. 8. The bar $D^3$ will preferably have a facing of elastic material, so as to effectually hold the paper. When the jaws $T''$ $U''$ are in their rear position adjacent to the bars $C^3$ $D^3$ the upper jaw and upper bar are closed down upon the paper, and the upper bar remains in that position until the knife $K^3$ moves down and cuts off the strip of paper, after which the bar elevates again and permits the paper to be moved. The upper jaw, $U''$, moves back before the bar $D^3$ rises.

The knife $K^3$ consists of a bar, $L^3$, having a series of pointed beveled knives, $M^3$, attached to it. The knife $K^3$ has a vertical movement in grooves at each side of the machine, and has a spring-tension upward by means of the springs $N^3$. The knife is given its downward movement, whereby the paper is cut, by the forward movement of the upper jaw, $U''$, which acts through the arms $P^3$, pivoted on the ends of the studs $Q^3$, and having their rear ends secured to the lugs $R^3$ on the knife-bar $K^3$, the front ends of the arms $P^3$ extending forward in proper relation to the spring-dogs $S^3$ to be acted upon by them. The dogs are pivoted on the front side of the jaw $U''$, and when the jaw is moving forward they catch in the notches $T^3$, as shown in dotted lines in Fig. 8, and elevate the arms $P^3$, which depresses the paper-knife $K^3$. During the backward movement of the jaw $U''$ the dogs $S^3$ strike the bent front ends of the arms $P^3$ and pass along the side of them without affecting the knife, the spring-tension of the dogs permitting this movement. The knife $K^3$ on its downward movement enters the groove $U^3$.

In rear of the bar $C^3$ is journaled, between the sides of the machine, the shaft $W^3$, upon which are arranged a series of clamps, $X^3$, and a bar, $Y^3$. The ends of the bar $Y^3$ are supplied with collars $Z^3$, through which the shaft $W^3$ passes.

Figure 17:
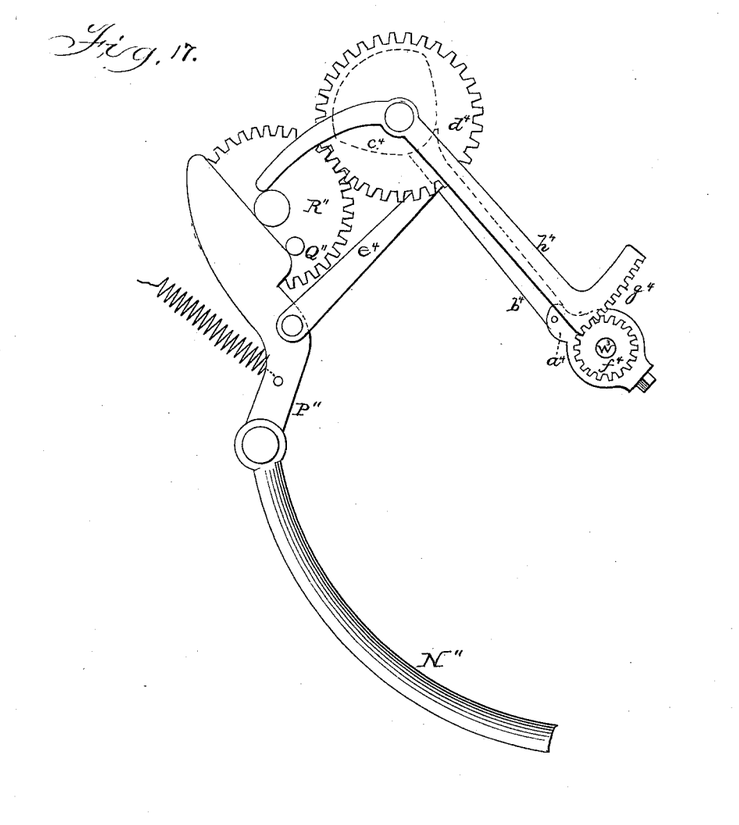
Fig. 17 is a side view of the arm $h^4$ and pawl $N''$ and connecting mechanism.

Upon the right-hand end of the shaft $W^3$ is furnished a lug, $a^4$, in which is pivoted the lower end of a rod, $b^4$, (see Fig. 17,) the upper end of which passes upward in proper relation to the cam $c^4$, secured upon the axle of the gear-wheel $d^4$, to be acted upon by it. The upper end of the rod $b^4$ is linked in the end of the rod $e^4$ and is sustained by it.

Upon the extremity of the shaft $W^3$ is a small pinion, $f^4$, which meshes with the teeth of the rack $g^4$, formed upon the end of the arm $h^4$, which is secured upon the outer extremity of the axle of the gear-wheel $d^4$, (see Figs. 1 and 19,) its rear end terminating in near relation to the cam $i^4$, secured upon the face of the gear-wheel $m^4$.

At the left-hand end of the shaft $W^3$ is provided a spring, $n^4$, (shown in Fig. 3,) to throw the clamps $X^3$ back to place when they have been tilted rearward; and for the purpose of retracting the bar $Y^3$, when it has been forced rearward from the rear edge of the bar $P''$, the spring $t^4$ (see Fig. 1) has been attached to the bar $h^4$, which acts to force the said bar back to its former position after the bulge of the cam $i^4$ has ceased to act upon it. This movement of the bar $h^4$ is communicated to the pinion $f^4$, and thereby retracts the bar $Y^3$ to its former position also. The front edge of the bar $Y^3$ is supplied preferably with a strip of bristles, for the purpose hereinafter mentioned, which may be secured in place by inserting its edge in a groove formed in the bar or otherwise, as may be desired. The strip of bristles may be dispensed with, if desired; but it is preferred to employ it, as it facilitates the proper pasting of the paper for the cigarettes. When the bar $Y^3$ is in its normal position its edge of bristles will rest upon the bar $C^3$ and its upper surface will be about on the same horizontal plane with the same.

Figure 26:
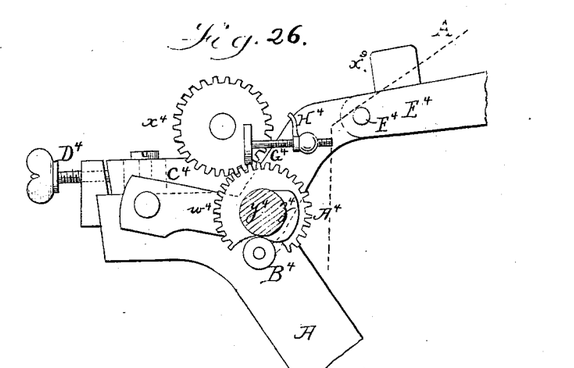
Fig. 26 is a view of one end of the pasting apparatus.

At a suitable elevation above and in rear of the bar $Y^3$ is the pasting apparatus, consisting of the two rollers $w^4$ and $x^4$, connected by gear-wheels, so as to have a simultaneous movement, the lower roller, $w^4$, being mounted on an axle, $y^4$, which has upon one end the cam $z^4$ (see Fig. 26) and a gear-wheel, $A^4$, which meshes with the gear-wheel $d^4$ and is operated by it. The wheel $A^4$ is loose upon the axle $y^4$, and is provided with a spring-pawl, 2, which engages the ratchet-wheel 3, rigidly affixed to the axle. Thus when the wheel $A^4$ is rotated by the adjacent gear-wheels its pawl 2 will engage the ratchet 3 and rotate the axle $y^4$, whereby motion is communicated to the lower paste-roller, $w^4$, and by it transmitted to the upper roller, $x^4$, through the connecting gear-wheels. As aforesaid, when the wheel $A^4$ is revolved it rotates the axle $y^4$; but when power is applied directly to the axle or hand-wheel 4 (shown in dotted lines in Fig. 1) the pawl 2 will slip over the ratchet 3 without moving the wheel $A^4$. This is to enable the attendant to turn the paste-rollers and get the paste thoroughly spread over them without running the machine.

Below the cam $z^4$ a small wheel, $B^4$, is secured upon the side of the machine, and as the lower roller, $w^4$, is rotated by the gear-wheel $A^4$ the bulge of the cam will ride over the said wheel $B^4$ and be forced upward by it, which movement elevates the front portion of the pasting apparatus, for the purpose hereinafter described. The center of the upper roller, $x^4$, is slightly in rear of that of the lower roller, $w^4$, and is mounted upon an axle having bearings in the sliding blocks $C^4$, operated by set-screws $D^4$. By working the set-screws $D^4$ the upper roller is either pressed more firmly against the lower roller or retracted therefrom. This is desirable in order that the same quantity of paste may be fed, whether the same is thick or thin.

Upon the end of the pasting apparatus is provided an arm, $E^4$, by which the same may be turned up toward the rear, and the paste-rollers thus elevated clear of the paper. This is only necessary when it is desired to examine or correct some of the parts of the machine.

Upon the arm $E^4$ is provided a pin, $F^4$, which springs out over the edge of the side frame, A, when the apparatus is elevated, and sustains it in such position. The pin $F^4$ is carried by and receives its movement from the spring $x^9$, which is a flat piece of spring metal secured at its front edge to the lever $E^4$. A part of the spring $x^9$ projects above the edge of the lever $E^4$ sufficiently to act as a thumb-piece, whereby when the lever has been elevated and the pin $F^4$ springs out over the edge of the frame A, and it is desired to again depress the lever, the action of the spring may be overcome by the pressure of the thumb and the pin retracted to permit the descent of the pasting apparatus and lever. The arm $E^4$ is also provided on its outer side with a stud, in which works the set-screw $G^4$, having a locking-nut, $H^4$. (Shown in Fig. 26.) The point of the screw $G^4$ impinges the edge of the side frame, A, and supports the front portion of the pasting apparatus. The elevation of the front portion of the pasting apparatus may therefore be regulated by the set-screw $G^4$, and the relation of the paste-rollers $w^4 x^4$ with the tilting bar $Y^3$, carrying the paper, thus controlled at will. When the rollers $w^4 x^4$ are lowered the paper will have a broader sweep against the roller $w^4$, and when they are elevated it will have a sweep which is more narrow. Thus the width of the paste on the edge of the paper may be readily governed.

In rear of the pasting apparatus is journaled in the sides of the machine the shaft $I^4$, upon which is mounted the rocking carriage $J^4$, and upon the left-hand end the cam $K^4$. In the carriage $J^4$ is journaled the shaft $L^4$, having secured upon its ends the arms $M^4$, and the shaft $N^4$, which will be connected with the shaft $I^4$ by gear-wheels $P^4$, so that each will have a similar movement at the same time. The arm $M^4$, at the right-hand end of the shaft $L^4$, hangs down in near relation to the cam $K^4$ at the end of the shaft $I^4$.

Figures 11, 12, 13, 14, 15, 16:
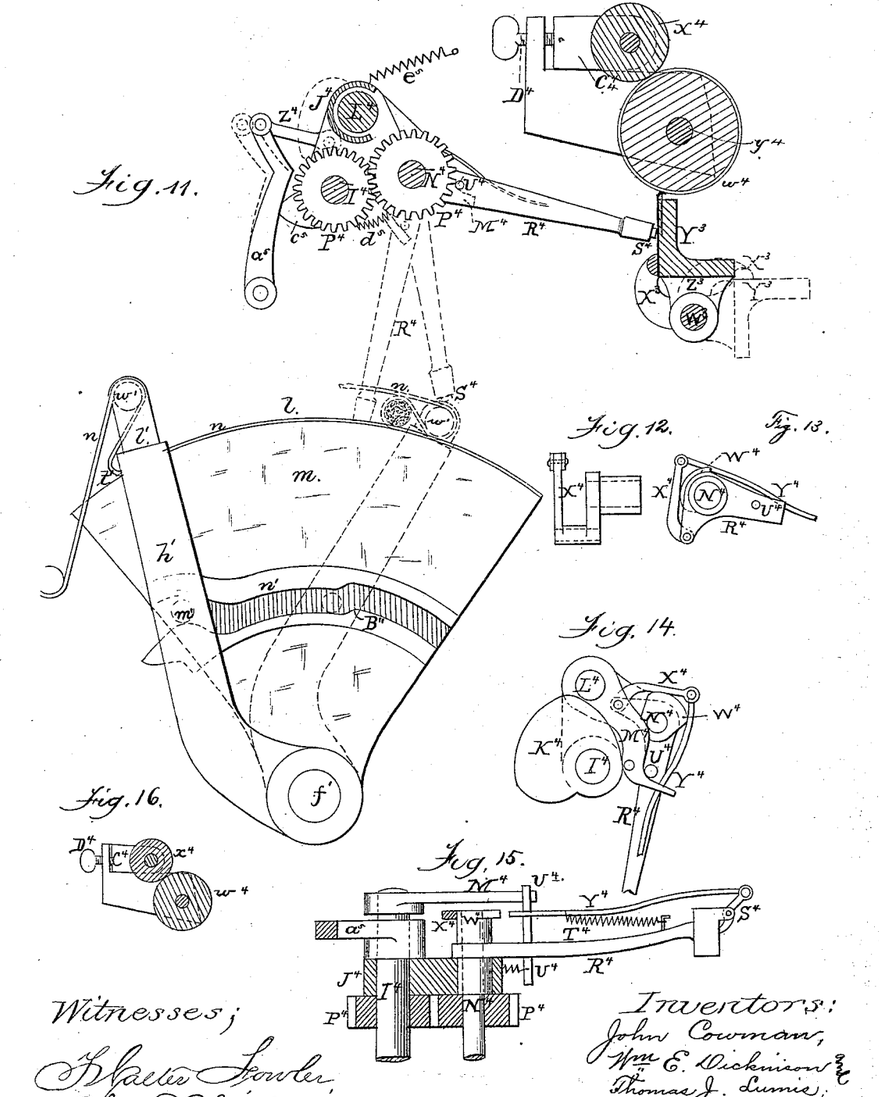

Upon the ends of the shaft $N^4$ are loosely mounted the arms $R^4$, which extend forward and have pivoted in the outer edges of their ends the fingers $S^4$, which are clamped against the faces of the ends of the arms $R^4$ by the springs $T^4$, as shown in Fig. 15.

Near the upper ends of the arms $R^4$ are provided pins $U^4$, which rest in pockets formed in the arms $M^4$, and which impart motion to the arms $R^4$.

Upon the ends of the shaft $N^4$ are secured cams $W^4$, which will operate at the proper time to draw the lever $X^4$ and arms $Y^4$, which extend from the fingers $S^4$, upward, and remove the contact of the fingers from the ends of the arms $R^4$. The rods or arms $Y^4$ are pivoted at their lower ends in the outer extremities of the pivoted fingers $S^4$, their upper ends being pivotally connected with the levers $X^4$, which are pivoted to the carriage $J^4$.

Upon the left-hand end of the carriage $J^4$ is pivoted an arm or link, $Z^4$, having its outer or rear end connected by a pivot to the upper end of the lever $a^5$, the lower end of which is adjustably secured in the slot $b^5$ (see Fig. 3) by a set-screw, the purpose of the adjustment being to govern the sweep of the rocking carriage $J^4$ and its connections.

Upon the left-hand end of the shaft $I^4$ is mounted a cam, $c^5$, which operates through the lever $a^5$ and arm $Z^4$ to tilt the carriage $J^4$ rearward.

Springs $d^5$ will be supplied for the purpose of giving the arms $R^4$ a downward tension. The carriage $J^4$ will be supplied with springs $e^5$, which extend from the ends of the carriage to the sides A B, and operate to draw the carriage forward after it has been tilted rearward in the operation of the machine.

In the description above given we have set out the operation of preparing the tobacco, feeding it forward in a sheet, cutting off a strip of tobacco, and depositing it in the pocket $t'$. While this operation of preparing the strip of tobacco for the cigarette is being performed, the paper for rolling the cigarette is fed inward in the manner above described. After the proper quantity of paper has been fed inward upon the bar $Y^3$ the knife $K^3$ will descend, severing a strip, as aforesaid, to serve as a wrapper for the rod of tobacco. Just prior to the strip of paper being severed the rack $g^4$, which is actuated by the cam $i^4$ through the arm $h^4$, rotates the pinion $f^4$ and shaft $W^3$ to throw the clamps $X^3$ upward, over, and upon the rear surface of the bar $Y^3$, the clamps in this position serving effectually to hold the rear portions of the strip of paper firmly and smoothly against the bar $Y^3$ when the latter is in a horizontal position. The motion of the machine continuing, the cam $c^4$ forces the rod $b^4$ downward against the lug $a^4$, which tilts the bar $Y^3$ and the strip of paper upward and rearward, as shown in Fig. 11 in full lines, the front edge of the strip of paper, which is left projecting over the flexible edge of the bar $Y^3$, being in this movement touched against the paste-roller $w^4$, whereby the said edge of the paper, for a space of about one-sixteenth of an inch, is covered with a thin layer of paste. In this movement of the strip of paper to the paste-roller $w^4$ the clamps $X^3$ turn with tilting bar $Y^3$ and retain the paper upon the same. At this point in the operation the cam $Z^4$ will come in contact with the small wheel $B^4$, secured on the side of the machine, and in riding over it will elevate for a moment the front portion of the pasting apparatus, whereby the said roller $w^4$ is lifted up clear of the strip of paper without danger of tearing it. After the edge of the paper has received a layer of paste and the paste-roller has been elevated, as aforesaid, the springs $e^5$ operate to tilt the carriage $J^4$ forward, while the cam $K^4$, acting through the shaft $L^4$ on the arms $M^4$, brings the ends of the arms $R^4$ up in close relation to the ends of the strip of paper which is on the tilting bar $Y^3$, and at the same time the cams $W^4$ draw on the levers $X^4$ and arms $Y^4$, thereby overcoming the tension of the springs $T^4$ and opening the fingers $S^4$ from the ends of the arms $R^4$. The arms $R^4$ are of such length that when they are thrust forward toward the ends of the bar $Y^3$ they will just reach the ends of the strip of paper, and when the fingers $S^4$ are open their inner ends will be on the front side of the said two opposite ends of the strip of paper. The cams $W^4$, when the arms $R^4$ and fingers $S^4$ are in this position, pass from contact with the levers $X^4$ and arms $Y^4$, which allows the fingers $S^4$ to close upon the ends of the strip of paper, securely holding them against the arms $R^4$. At this point in the operation the lever $h^4$ of the rack $g^4$, operated by the cam $i^4$, will rotate through the pinion $f^4$ the shaft $W^3$ toward the rear, thereby raising the clamps $X^3$ from the bar $Y^3$ and strip of paper, and lowering them out of the way. At the same time the cam $c^4$ passes the rod $b^4$ and permits the spring $t^4$ on the axle of the bar $Y^3$ to throw the said bar into its former horizontal position to receive another strip of paper from the feed jaws, after which the clamps $X^3$ are brought up and made to hold down the paper against it, as before. The movement continuing, the cam $c^5$ on the shaft $I^4$ operates through the lever $a^5$ and arm $Z^4$ to tilt the upper end of the carriage $J^4$ rearward, when the arms $R^4$, carrying the strip of paper, will fall into a vertical position, after which, the cam $c^5$ having passed its contact with the lever $a^5$, the springs $e^5$ will draw the upper portion of the carriage $J^4$ forward, which has the effect of thrusting the arms $R^4$ vertically downward, thereby carrying the said strip of paper downward, and holding it very close and at a tangent to the front portion of the flexible apron $n$, resting upon the table $l$. In the present condition of the machine the strip of paper has been cut off, its edge pasted, and is held close to the front upper surface of the flexible apron $n$, while the strip of tobacco, corresponding in length to the strip of paper, is resting in the pocket at the rear end of the said flexible apron $n$. The oscillating bars $h'$ are now brought forward on their bearings, which causes the pocket $t'$ to travel toward the front over the table $l$. As the bars $h'$ are moving forward, as aforesaid, the strip of tobacco will be caught by the rubbing-surfaces of the pocket $t'$ and rolled into a round firm rod of tobacco. The strip of tobacco is now being rolled forward in the pocket $t'$ toward the strip of paper held by the arms $R^4$ at the front portion of the table $l$, and, the movement of the machine being continued, the said strip of tobacco will be rolled onto the said strip of paper, which will be rolled around the strip of tobacco by the movement of the upper half of the pocket $t'$. The tobacco having been rolled in the rear portion of the strip of paper, the cams $W^4$ operate through the levers $X^4$ and arms $Y^4$ to open the fingers $S^4$, when the strip of paper will be completely rolled around the rod of tobacco, and be retained thereon by its pasted edge, hereinbefore described, lapping onto the dry portion, forming a long cigarette. Upon the opening of the fingers $S^4$ at this point they loosen their hold upon the strip of paper, and are carried upward again to receive another strip from the bar $Y^3$ by the cam $K^4$, acting through the shaft $I^4$ on the arms $M^4$.

The long cigarette, formed as above set forth, is rolled off the front edge of the table $l$ by the forward movement of the bars $h'$ and passed to the cutting devices, hereinafter described. After the long cigarette has been rolled from the table $l$ the bars $h'$ return to their former position and bring the sheet $n$ into proper relation to receive another strip of tobacco for another long cigarette. With every revolution of the driving-axle of the machine the mechanism is operated to form a long cigarette and cut it up into smaller ones of the proper length for use. The movements of the different elements of the machine are all automatic, it being only necessary to apply motive power, feed the tobacco, and provide a roll of paper. When the long cigarette has been rolled off the front edge of the table *l* it will slide down between the wire racks D'' and E'' to the cylinder F'', mounted in bearings in the sides of the machine. The racks D'' and E'' are two inclined open wire frames, separated a distance sufficient to permit the passage of the cigarette between them. They act as guides, and the upper end of the frame D'' is flared toward the front, forming a mouth to receive the cigarette from the table *l*. (See Fig. 3.)

The cylinder F'' will have a number of pockets, G'', formed at regular intervals on its surface, the pockets extending the full length of the cylinder and being of proper size to effectually hold the cigarette. The cylinder F'' is encircled at regular distances by the grooves H'', (see Fig. 4,) in which the edges of the knives I'' work when the machine is in operation. The knives I'', preferably five being employed, are secured upon the shaft J'', which is mounted in bearings above the cylinder F'', and receive their motion through a belt, K'', from the band-wheel L'', mounted upon the end of the driving-shaft Y. Upon one end of the shaft supporting the cylinder F'' is secured the ratchet-wheel M'', which is engaged by a pawl, N'', the upper end of which is pivoted in the lower end of the arm P'', (see Figs. 4 and 17,) the upper end of which is in suitable relation to the pin Q'' to be acted upon by it as the gear-wheel R'' is rotated. When the pin Q'' strikes the upper end of the arm P'' the lower end thereof is moved forward, which has the effect of thrusting the pawl N'' toward the front and rotating the ratchet-wheel M'' and cylinder F'' a distance equal to the space between two of the teeth on the said wheel M''. The machine is timed so that with every revolution of the driving-shaft the cylinder F'' will have this partial revolution, whereby as each cigarette is formed and rolled down the racks D'' and E'' the cigarette previously formed is brought up under the knives I'' and cut into lengths.

What we claim as our invention, and desire to secure by Letters Patent, is—

1. The board P, suspended horizontally by the springs N, in combination with the loosely-sustained vertical post R, dog S, and cam X, substantially as set forth.

2. In a cigarette-machine in which the tobacco is rolled by a flexible apron, the means herein described for forming the tobacco-pocket, consisting of the roller *d*, secured between the sliding plates *b*, which are supplied with springs *e*, and means for depressing the plates, substantially as set forth.

3. The combination of the tobacco feed-table, tobacco-knife, upper and lower slides, and upper and lower strippers, the upper slide being adapted to drop the strip of tobacco upon the lower slide, and the lower slide then to drop it into the rolling-pocket, substantially as set forth.

4. In a cigarette-machine, the combination of the rolling-apron having cigarette-pocket, the roller *w'* for closing the pocket and moving it forward, and the rod or roller *p*, provided with mechanism whereby it is rocked upward while the pocket is being closed, and then downward again during the forward movement of the pocket, substantially as set forth.

5. The apron having its rear edge secured upon a rod, and sufficiently slack in its adjustment to have a cigarette-pocket formed at its end, in combination with the roller *w'*, secured between bars, which are provided with mechanism to give them a vertical movement and also an oscillatory movement, the roller being employed for closing said pocket and carrying it forward, and with mechanism for giving the rod at the rear edge of the apron an upward movement while the pocket is being closed, and then a downward movement, substantially as set forth.

6. The combination of the traveling jaws extending across the entire width of the paper for feeding said paper to the knife in the manner described, the upper jaw having a spring-tension downward on the lower jaw, and provided in its ends with pins *t''*, which, upon the forward movement of the jaws, ride up inclined surfaces and are gradually forced into their pockets, whereby at the extremity of the forward movement the spring is permitted to close the jaws against the paper, substantially as set forth.

7. In a cigarette-machine, the combination of the tobacco feed-table, the tobacco-knife, upper and lower slides, and upper and lower scrapers, the slides being secured upon the lower ends of the swinging bars, the upper ends of which have a spring-tension toward the rear, and are adapted to be moved toward the front by cams, substantially as set forth.

8. In a cigarette-machine, the presser-board P, suspended by springs in a horizontal position, in combination with the post R, set loosely in bearings, and means for depressing the post, substantially as set forth.

9. The combination of the traveling jaws or bars T'' U'' for feeding the paper to the knife, the upper jaw having a spring, *n''*, and pins *t''*, with the inclines *w''* and *x''*, substantially as specified.

10. In a cigarette-machine, the combination of the paper-cutter and traveling feed-jaws, the cutter having a spring-tension upward, and provided with mechanism which is actuated to depress the knife by the forward movement of the feed-jaws, substantially as set forth.

11. In a cigarette-machine, the combination of the paper-cutter having a spring-tension upward, and suspended by the pivoted bars P³, the traveling feed-jaws T'' U'', and the spring-bars S³, which engage the bars P³ upon the forward movement of the feed-jaws, substantially as set forth.

12. The apron having its rear edge secured upon a rod, and adapted to have a cigarette-pocket formed in it, in combination with the roller for closing the pocket and carrying it forward, and with the rod $t$, link $x$, lever $y$, and cam $a'$, the rear end of the lever having a spring-tension downward, substantially as set forth.

13. In a cigarette-machine, the combination of the traveling feed-jaws, the clamping-jaws, and the plates $H^3$, secured adjacent the ends of the feed-jaws by pins $I^3$, which enter inclined elongated slots, said plates being provided to raise or lower the upper clamping-jaw when actuated by the feed-jaws, substantially as specified.

14. In a cigarette-machine, the combination of the feed-jaws extending across the machine, the lower jaw being secured between racks $X''$, with the mechanism for imparting a traveling movement to them, which consists of the said racks, the pinions, and the bar $b''$, having a rack on its end, the movement of the bar $b''$ being controlled by the pin $f''$ impinging a cam-surface, substantially as set forth.

15. In a cigarette-machine, the combination of the feed-jaws with the bar $b''$ and intermediate mechanism, the bar having a rack provided with adjustable bearings, whereby the extent of the movement of the jaws may be regulated, substantially as described.

16. In a cigarette-machine, the combination of the pivotally-secured pasting apparatus, the set-screw and locking-nut, and the frame against which the set-screw acts, substantially as and for the purpose set forth.

17. In a cigarette-machine, the combination, with the pivotally-secured pasting apparatus, of the bar $E^4$, spring-pin $F^4$, and frame upon which the pin acts, whereby the apparatus may be elevated and sustained in that position and the paste-rollers turned independently of the other parts of the machine, substantially as set forth.

18. In a cigarette-machine, the pasting apparatus consisting of two rollers geared together, in combination with the gear-wheel which imparts motion to the lower roller, and is mounted loosely upon the end of its axle, the ratchet-wheel rigidly secured on the end of said axle, and the spring-pawl secured on the said gear-wheel in appropriate relation to the ratchet, whereby the motion of the gear-wheel may be communicated to the axle, and at the same time permit the axle to be turned by a hand-wheel while the said gear-wheel is at rest, substantially as set forth.

19. In a cigarette-machine, the roller $F''$, having a series of pockets, $G''$, and a series of annular grooves, $H''$, in combination with the series of cutters $I''$, the roller having mechanism to impart an intermittent motion to it, substantially as set forth.

20. The roller $F''$, having longitudinal pockets $G''$ and annular grooves $H''$, in combination with the series of cutters $I''$, and with the ratchet $M''$ and pawl $N''$, actuated by a cam to move the ratchet, substantially as set forth.

In testimony that we claim the foregoing improvement in cigarette-machines, as above described, we have hereunto set our hands this 27th day of February, 1882.

JOHN COWMAN.
WILLIAM E. DICKINSON.
THOMAS J. LUMIS.

Witnesses:
　S. W. ADAMS,
　S. FRANKENFIELD.